(12) United States Patent
Marchon

(10) Patent No.: US 6,850,391 B1
(45) Date of Patent: Feb. 1, 2005

(54) DESIGN OF A RIGID DISC PLASTIC SUBSTRATE WITH HIGH STIFFNESS INSERT

(75) Inventor: Bruno J. Marchon, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/521,704

(22) Filed: Mar. 9, 2000

Related U.S. Application Data

(63) Continuation of application No. 09/064,641, filed on Apr. 22, 1998, now Pat. No. 6,055,140.
(60) Provisional application No. 60/053,782, filed on Jul. 25, 1997.

(51) Int. Cl.[7] .................................................. G11B 5/82
(52) U.S. Cl. ...................................... 360/135; 720/719
(58) Field of Search .................... 360/135; 428/694 ST, 428/694 SL, 64.1–64.4, 65.3, 221, 548; 369/283, 286

(56) References Cited

U.S. PATENT DOCUMENTS

| | | | |
|---|---|---|---|
| 3,646,533 A | 2/1972 | Rosenblum | 360/135 |
| 3,843,188 A | 10/1974 | Kirschner | 295/7 |
| 3,857,296 A | 12/1974 | Tsunoda | 74/443 |
| 4,376,963 A | 3/1983 | Knoop et al. | 360/135 |
| 4,415,942 A | 11/1983 | Frosch et al. | 360/135 |
| 4,440,586 A | 4/1984 | Lippits et al. | 156/151 |
| 4,726,007 A | 2/1988 | McCormack | 369/286 |
| 5,123,625 A | 6/1992 | Spaltofski | 248/634 |
| 5,214,549 A | 5/1993 | Baker et al. | 360/97.02 |
| 5,447,801 A | 9/1995 | Masuda et al. | 428/567 |
| 5,487,926 A | 1/1996 | Kuribayashi et al. | 428/33 |
| 5,538,774 A | 7/1996 | Landin et al. | 428/64.1 |
| 5,585,195 A | 12/1996 | Shimada | 428/548 |
| 5,725,931 A | 3/1998 | Landin et al. | 360/135 |
| 6,055,140 A * | 4/2000 | Marchon | 360/135 |
| 6,125,099 A * | 9/2000 | Boutaghou et al. | 369/272 |

OTHER PUBLICATIONS

J. McAllister, "Disk Flutter: Causes and Potential Cures", Data Storage, May/Jun. 1997, pp. 29–34.

* cited by examiner

Primary Examiner—Brian E. Miller
(74) Attorney, Agent, or Firm—Raghunath S. Minisandram; Jesus Del Castillo

(57) ABSTRACT

An injection molded plastic disc substrate incorporating a stiff insert made of a very stiff material (metal, ceramic, composite . . . e.g. silicon) embedded in the plastic matrix. Preferably, the insert has a circular center region and radially extending fingers. Additional features of the web may include one or more chordal connecting elements extending between the fingers. In this way, both vibration or flutter in the circumferential or radial direction is suppressed by the insert.

8 Claims, 2 Drawing Sheets

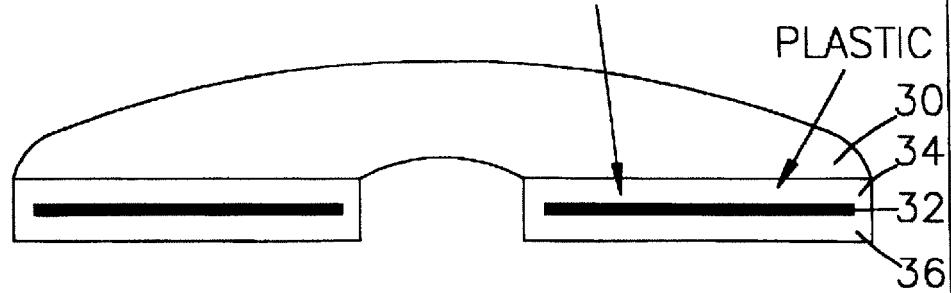
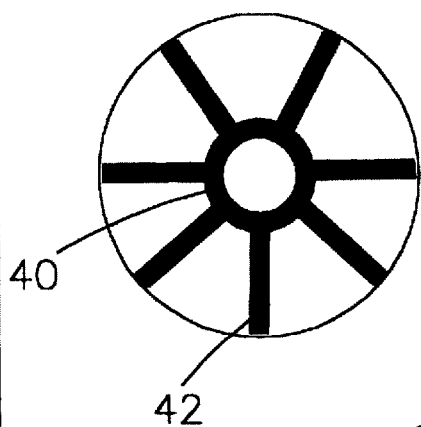
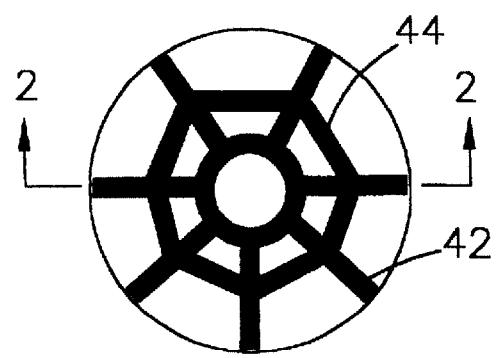
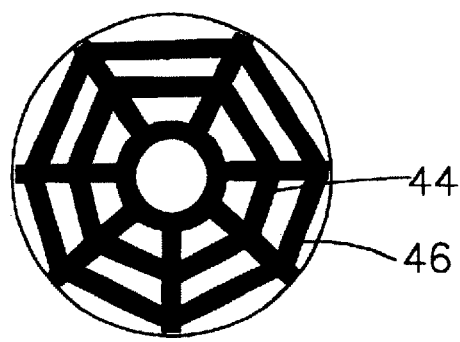

US 6,850,391 B1

DESIGN OF A RIGID DISC PLASTIC SUBSTRATE WITH HIGH STIFFNESS INSERT

This application is a con of Ser. No. 09/064,641 filed Apr. 22, 1998 now U.S. Pat. No. 6,055,140, which claims benefit of Provisional Appl. 60/053,782 filed Jul. 25, 1997.

FIELD OF THE INVENTION

The invention is directed generally to the field of disc drives, and more particularly to an improved disc used for recording in such a disc drive.

BACKGROUND OF THE INVENTION

Computer disc drives store information on rotating recordable discs. The information is stored in concentric tracks on the recording disc. A transducer element which flies on a thin film of air over the surface of the disc is moved from track to track on these discs to read and record the desired information. Typically, the rotating discs are closely held apart in a parallel stacked relationship. Sometimes however, only one rotating disc is found in the disc drive. In either case, in order to achieve a tight packing density of bits on the disc, the transducer elements must be held very closely spaced from the rotating disc surface.

As a result, as track densities and drive speeds increase, disc vibration becomes a significant cause of track misregistration. The rigid discs for disc drives need to have good mechanical properties in terms of stiffness, as it has been found that "out of plane" vibrations or "flutter" during high RPM operation can lead to this track misregistration. According to an article by McAllister in "Data Storage" May-June, 1997, pp. 29–32, the vibration or flutter is primarily caused by internal air flow disturbances. It has been found that one way to lower vibration amplitude is to increase the substrate stiffness as measured by the elastic modulus E, as reported in "Characterization of Disc Vibrations on Aluminum and Alternate Substrates", by McAllister, IEEE Trans. Magn, Vol. 33, pp. 968 (1997). According to McAllister, another way to decrease vibration amplitude is to increase substrate damping. In this category, one scheme has been proposed to make a laminated structure by providing a sandwiched of a thin visco-elastic film between two metallic layers, which would typically be aluminum.

However, with the advent of another technology, i.e., the plastic disc substrate, other solutions must be found. This technology is used widely in removable storage applications such as CD-ROM and magneto-optical; the technology is extremely appealing for rigid disc drives as it offers an extremely inexpensive and simple disc process (injection molding). Such a process, in principle, would not require any surface finishing (grinding, polishing) and washing. However, most plastic substrates are likely to offer unacceptable vibration characteristics at high RPM if made thin (31.5 mils or tinner).

SUMMARY OF THE INVENTION

It is an object of the present invention to provide an improved molded disc for use in a rigid disc drive.

A related objective of the invention is to provide a molded disc which can be easily and economically manufactured on a high speed repetitive basis.

Another related objective of the invention is to provide an approach to fabricating a disc on a highly repetitive high speed basis, and wherein the completed product has reduced or eliminated vibrations.

These and other objects of the present invention are achieved by fabricating an injection molded plastic disc substrate incorporating a stiff insert made of a very stiff material (metal, ceramic, composite . . . e.g. silicon) embedded in the plastic matrix. Preferably, the insert has a circular center region and radially extending fingers. Additional features of the web include one or more connecting regions extending between the fingers. In this way, both vibration or flutter in the circumferential or radial direction is suppressed by the insert.

Other features and advantages of the present invention will be apparent to a person of skill in the art who studies the disclosure given below with respect to the following figures.

BRIEF DESCRIPTION OF THE DRAWINGS

FIG. 2 is a vertical sectional and partially perspective view of a disc according to the present invention.

FIGS. 3A, 3B and 3C are top plan views, in section, of discs incorporating differing inserts in the substrate.

DETAILED DESCRIPTION OF A PREFERRED EMBODIMENT

Figure 1:
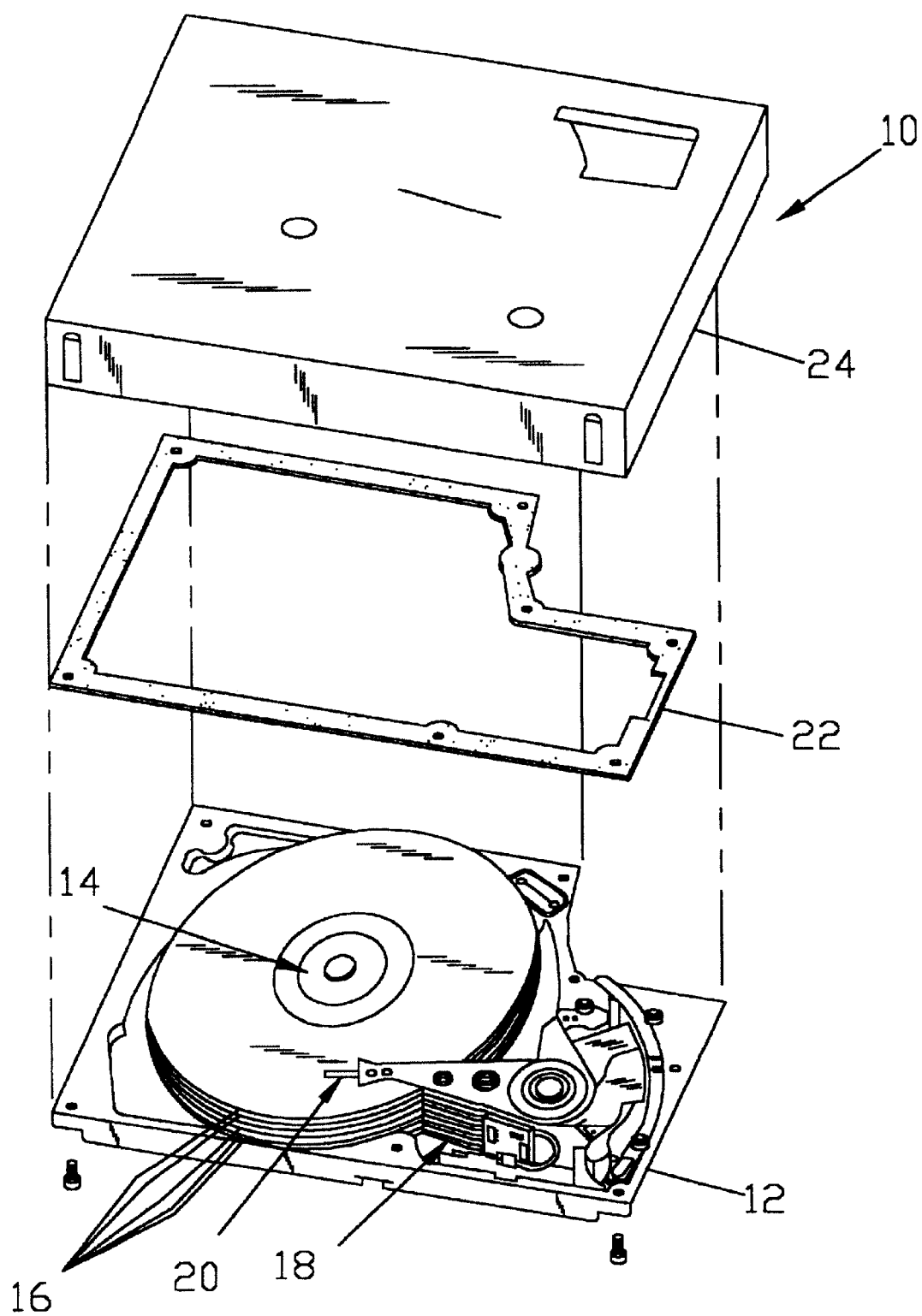
FIG. 1 is an exploded perspective view of a disc drive in which the present invention may be useful.

FIG. 1 is an exploded perspective view of a disc drive storage system in which the present disc would be useful. Clearly, the disc is not limited to use in such disc drives. in fact, although a magnetic disc drive is shown, the disc could equally well be used in a magneto-optical disc drive. In fact, plastic disc substrates would probably be especially useful in removable storage applications, such as CD-ROM or magneto-optical drives. Thus, FIG. 1 is provided primarily to give an illustrative example of the environment in which a rotating hard storage disc is used.

In this particular example of FIG. 1, the storage system 10 includes a housing base 12 having a spindle motor 14 which rotatably carries the storage discs 16 which are to be discussed in detail below. An armature assembly 18 moves transducers 20 across the surface of the discs 16. The environment of disc 16 is sealed by seal 22 and cover 24. In operation, discs 16 rotate at high speed while transducers 20 are positioned at any one of a set of radially differentiated tracks on the surface of the disc 16. This allows the transducers 20 to read and write encoded information on the surface of the discs at selected locations. The discs rotate at very high speed, several thousand RPM, in order to maintain each transducer flying over the surface of the associated disc. In present day technology, the spacing distance between the transducer and the rotating disc surface is measured in micro inches; thus it is absolutely essential that the disc does not vibrate while it is being rotated, as such vibration could easily disturb the air flow which is maintaining the flight of the transducer over the surface, or simply cause mechanical contact between the transducer and the disc surface. Such contact would probably damage the disc surface, resulting in the loss of disc storage space; it could even damage the transducer, resulting in loss of use of the disc drive.

FIGS. 3A, 3B and 3C are all plan views of different embodiments of the present invention; FIG. 2 is a sectional view which would be applicable to any of these embodiments. FIG. 2 shows an injection molded plastic disc substrate 30 with a high stiffness insert 32 embedded in the substrate. The thickness of the layers including the layer 34 above the plastic insert and the layer 36 below it can be adjusted for best performance in terms of effectiveness of recording simplicity of fabrication. The thickness of the insert 32 could be up to 90% of the total thickness of the entire disc. The insert 32 is made of a stiff low vibration amplitude material which generally may be described as a metal, ceramic, composite or the like having these characteristics. Example for the insert might be silicon carbide or titanium, but others are certainly available based on the costs and ease of incorporation into the injection molding process.

The insert 32 may be a solid disc. In other embodiments, to avoid unnecessary weight or the like, and to minimize vibration amplitudes as well as potentially minimizing manufacturing costs and complexity, preferable alternatives appear in FIGS. 3A, 3B and 3C. For example, the insert 32 of FIG. 3A includes a circumferential section 40 and a plurality of radially extending arms 42. This design would be considerably more effective than any suggestion of the prior art, while minimizing the costs required to incorporate such a silicon carbide, titanium or similar material into what otherwise would be an inexpensive plastic disc. Referring to FIG. 3B, this shows radial arms 42 connected at about a midway point by interior chordals 44. As the vibration waves can move both radially and in a circumferential pattern as the disc rapidly rotates, the incorporation of such a chordal 44 may provide significant additional benefits in terms of fully achieving the desired damping.

Referring to FIG. 3C, this figure shows both internal chordals 44 connecting the arms as well as outer chordals 46 which will provide either further damping of the circumferential vibrations, because these vibrations would be highly likely to create a contact incident between the vibrating disc and the transducer flying closely over its surface, both sets of chordals may be highly desirable; the use of the additional material would have a cost impact, which would have to be weighed against the benefit to be achieved.

Other features and advantages of the present invention may be apparent to a person of skill in the art who studies this. Therefore, the scope of the present invention should be limited only by the following claims.

What is claimed is:

1. A disc suitable for use in a rotating magnetic recording system comprising:
    a plastic substrate suitable for recording and storing data; and
    an insert embedded in the substrate for damping said substrate against radial and circumferential vibrations, wherein the insert further comprises:
    an annular center section; and
    a plurality of arms extending radially from the annular section; and
    wherein said arms extend towards but not to an edge of said disc.

2. A disc as claimed in claim 1, wherein the insert further comprises:
    chordals disposed in a spaced apart relation to the center section connecting the radially extending arms and forming an open web.

3. A disc as claimed in claim 1, wherein the substrate is injection molded over said insert.

4. A disc as claimed in claim 1, wherein the insert is metal, ceramic, silicon, silicon carbide, titanium or a composite consisting of mixtures of the foregoing or similar materials.

5. A disc as claimed in claim 1, wherein said disc is about 31.5 mils or thinner.

6. A disc as claimed in claim 1, wherein the insert has a thickness up to 90 percent of the disk thickness.

7. A disc as claimed in claim 2, wherein at least one of the plurality of arms extends radially beyond an outermost chordals.

8. A disc suitable for use in a rotating magnetic recording system comprising:
    a molded plastic substrate suitable for recording and storing data having an insert therein for damping said disc against radial and circumferential vibrations, wherein the insert includes means for providing radial damping to the disc comprising a radially extending arms; and
    wherein the insert includes web means for providing circumferential damping comprising chordal connecting the radially extending arms and forming an open web wherein at least one of the arms extends radially beyond an outermost chordal.

* * * * *